(12) United States Patent
Tatasciore et al.

(10) Patent No.: US 11,466,459 B1
(45) Date of Patent: Oct. 11, 2022

(54) METHOD FOR MANUFACTURING A ONE-PIECE GUTTER GUARD ARTICLE EMPLOYING A WIRE MESH FILTER

(71) Applicants: Christopher G. Tatasciore, Loomis, CA (US); William Lasell, Loomis, CA (US)

(72) Inventors: Christopher G. Tatasciore, Loomis, CA (US); William Lasell, Loomis, CA (US)

(*) Notice: Subject to any disclaimer, the term of this patent is extended or adjusted under 35 U.S.C. 154(b) by 153 days.

(21) Appl. No.: 16/802,260

(22) Filed: Feb. 26, 2020

Related U.S. Application Data

(60) Provisional application No. 62/811,150, filed on Feb. 27, 2019.

(51) Int. Cl.
*B21F 45/00* (2006.01)
*B21D 39/02* (2006.01)
*E04D 13/076* (2006.01)

(52) U.S. Cl.
CPC ......... *E04D 13/076* (2013.01); *B21D 39/021* (2013.01); *B21F 45/00* (2013.01)

(58) Field of Classification Search
CPC ..... E04D 13/064; E04D 13/076; E04D 13/10; B21D 39/021; B21F 45/00
See application file for complete search history.

(56) References Cited

U.S. PATENT DOCUMENTS

| | | | | |
|---|---|---|---|---|
| 4,941,299 | A * | 7/1990 | Sweers | E04D 13/076 52/12 |
| 4,982,487 | A * | 1/1991 | Maruko | B21D 39/02 29/243.58 |
| 9,021,747 | B2 | 5/2015 | Lenney et al. | |
| 10,376,946 | B1 * | 8/2019 | Ealer, Sr. | E04D 13/064 |
| 2007/0214731 | A1 * | 9/2007 | Bachman | E04D 13/076 52/12 |
| 2011/0067318 | A1 * | 3/2011 | Lenney | E04D 13/076 52/12 |
| 2011/0272344 | A1 * | 11/2011 | Higginbotham | E04D 13/076 210/494.1 |
| 2015/0128422 | A1 * | 5/2015 | Rasmussen | B21D 35/00 29/897.32 |
| 2015/0143756 | A1 * | 5/2015 | Higginbotham | E04D 13/076 52/12 |
| 2019/0153730 | A1 * | 5/2019 | Sager | E04D 13/002 |

* cited by examiner

*Primary Examiner* — Teresa M Ekiert
(74) *Attorney, Agent, or Firm* — Costello Law Corporation, A California Professional Corporation

(57) ABSTRACT

The invention is a continuous gutter guard manufacturing process and a one-piece gutter guard article made therefrom which crimps a wire mesh filtration screen within the recesses of upper and lower supports of the one-piece gutter guard article. The wire mesh filtration screen has no underlying support, which is characteristic of a one-piece gutter guard construction. The upper and lower edges of the mesh filtration screen remain in a planar, non-embossed state, such that any ridges or patterns embossed into the screen do not follow into the portion of the screen that is crimped within the upper and lower supports of the gutter guard. This construction prevents the formation of debris pockets which can significantly reduce the performance of a one-piece gutter guard.

6 Claims, 11 Drawing Sheets

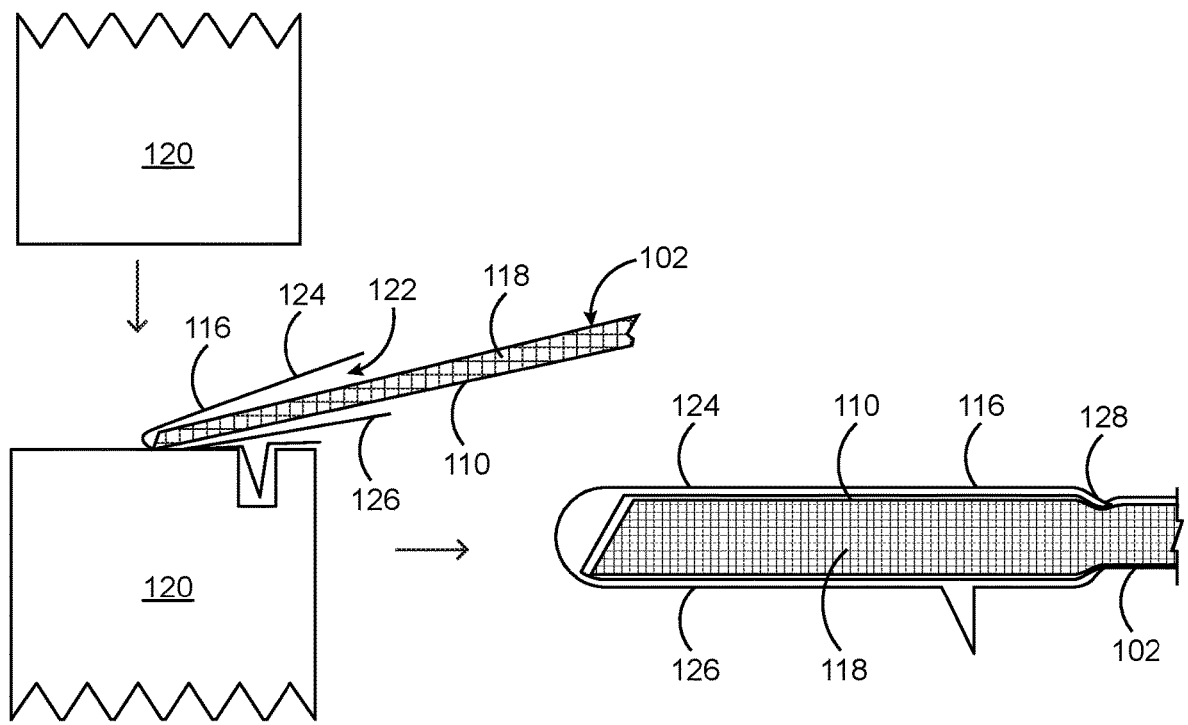
FIG. 2
(PRIOR ART)
FIG. 3A
(PRIOR ART)
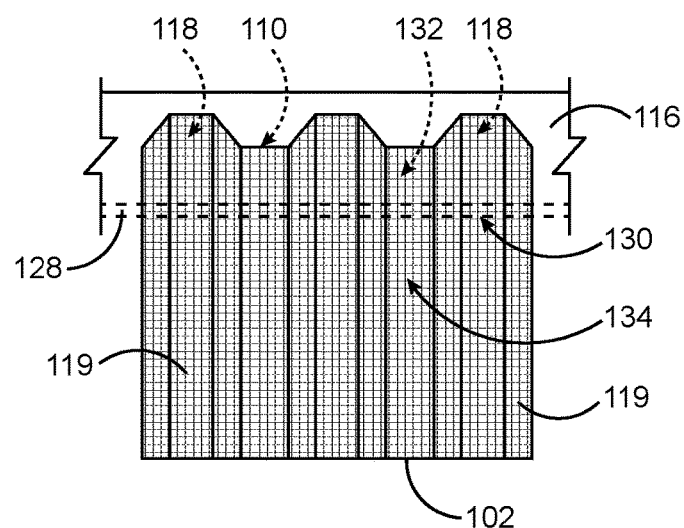
FIG. 3B
(PRIOR ART)

METHOD FOR MANUFACTURING A ONE-PIECE GUTTER GUARD ARTICLE EMPLOYING A WIRE MESH FILTER

CROSS-REFERENCE TO RELATED APPLICATIONS

This application claims the benefit of U.S. Provisional Patent Application No. 62/811,150, filed on Feb. 27, 2019.

BACKGROUND OF THE DISCLOSURE

Technical Field of the Disclosure

This invention relates to one-piece gutter guard products which employ a wire mesh filtration screen, and more particularly, relates to a method for continuously manufacturing a one-piece gutter guard employing a wire mesh filtration screen having embossed ridges.

Description of the Related Art

U.S. Pat. No. 9,021,747 issued to Lenney describes a one-piece gutter guard which derives its stiffness from a corrugated wire mesh filtration screen. The "one-piece" descriptor refers to the fact that the gutter guard of the '747 Patent does not require an additional underlying screen support, as the stiffness of the screen itself provides structural integrity. The filtration screen is embossed with corrugations which extend from the upper edge to the lower edge of the screen. The '747 Patent has the corrugated upper edge and lower edge of the screen fitting into recesses located in corresponding upper and lower supports. In one method of fastening the screen to the upper and lower supports, the corrugated screen can be crimped in the recesses present in the upper and lower supports. Due to the fact that the embossed corrugations run all the way from the top edge to the bottom edge of the screen, the ends of the corrugations, are themselves, captured and crimped within the recesses.

The art thus far teaches that the mesh filtration screen of one-piece gutter guards is crimped wholesale, embossed ridges and all, at their upper and lower screen edges. The recesses of the upper and lower supports capture the embossed ridges of the wire mesh filtration screen and the recesses are crimped shut upon the upper and lower screen edges by hammering or die stamping, the recesses being shut upon the screen and its embossed ridges. The reason the embossed ridges are included in the recesses are for ease of manufacturing. More specifically, embossing the screen edge to edge ensures that the screen is uniformly stretched across its surface without contrasting embossed and non-embossed areas. Embossing the screen edge to edge causes it to lay uniformly flat and the screen can be easily inserted into the recesses of the upper and lower supports and crimped during manufacturing. The sequence of manufacturing steps in the prior art has the mesh filtration screen first being embossed with a ridge pattern, either through die stamping or roll forming from the top edge to bottom edge, the screen itself being around five inches wide to accommodate the width of a typical gutter. Next the upper and lower screen edges (with embossed ridges) are inserted into recesses of the upper and lower supports of the gutter guard and crimped to complete the gutter guard manufacturing process.

By embossing screens edge to edge and then crimping the edges to the gutter guard supports, two problems arise. The first is that crimping the embossed ridges inside of the upper and lower supports creates pockets at the junction of the screen and the upper and lower supports; these pockets capturing and retaining roof and plant debris, which, in time, can cause the gutter guard to shut down due to debris overload. A second problem is that inserting the embossed screen edges by hand, into the recesses of the upper and lower supports, is man-labor-intensive, and therefore increases the cost to manufacture a finished gutter guard product.

A solution to the problems with manufacturing one-piece gutter guards with embossed ridges, would seem to be to manufacture the wire mesh filtration screen by embossing the center of the screen without embossing the edges and then crimp these flat, non-embossed edges, into the upper and lower supports. However, the existence of contrasting embossed vs. non-embossed sections of the screen laying side by side creates significant undulations in the screen. These undulations can rise as much as two-inches above a level surface, making it nearly impossible and man-labor intensive to try to force the undulating screen edges into the recesses of the upper and lower supports.

Therefore, there is a need for a one-piece gutter guard manufacturing process which can crimp a wire mesh filtration screen to a gutter guard support without including embossed ridges in the crimped portion and which overcomes the problem with undulations previously described. The present invention accomplishes these critical objectives.

SUMMARY OF THE DISCLOSURE

The invention is a continuous gutter guard manufacturing process which crimps a wire mesh filtration screen within the recesses of the upper and lower supports of a one-piece gutter guard. This invention focuses on one-piece gutter guards, which characteristically do not have an underlying support but instead have a wire mesh filtration screen located between an upper support and a lower support. Rigidity is afforded to the screen by selecting a screen having a wire mesh that affords sufficient stiffness and may also be embossed with patterns which increase stiffness. In the present invention, the upper and lower edges of the mesh filtration screen remain in a flattened, non-embossed state, such that any ridges or patterns embossed into the screen do not follow to the portion of the screen that is crimped in the upper and lower supports of the gutter guard.

The wire mesh filtration screen starts out in a flat, non-embossed configuration. Typically, the flat screen is about five inches wide but can be varied depending on the cross-wise span of the gutters to which the finished gutter guard is to be applied. In the manufacturing process, the upper and lower supports are attached to the flat screen by crimping the upper and lower edges of the screen in recesses of the corresponding upper and lower support. In addition to crimping methods, it is possible to glue the mesh filtration screen to the metal upper and lower supports. Another method involves plastic upper and lower supports which, like metallic supports, have recesses for inserting the upper and lower edges of the mesh filtration screen. The plastic upper and lower supports are heated, and the plastic melted into the screen to hold it fast to the upper and lower supports. Regardless of the method used to attach the upper and lower supports to the screen, the process described herein subjects the mesh filtration screen to embossing a pattern on the screen after the upper and lower supports have been attached. Without excluding these other methods of attaching the upper and lower supports, this disclosure will focus primarily on metallic upper and lower supports having recesses for inserting the upper and lower edges of a mesh filtration screen wherein the metallic supports are crimped upon the screen.

In one embodiment, the upper and lower supports are made by roll forming. If roll forming, the sheet metal feedstock is fed continuously into the roll former to create the upper and lower support. The roll former creates recesses in the upper and lower support in which the flat wire mesh filtration screen is inserted, the screen also being continuously fed into the recesses of the upper and lower supports as they are being formed, thus reducing significantly man-labor steps required to insert/feed the screen into the upper and lower supports. Next, the upper and lower edges of the screen are crimped in their corresponding upper and lower supports. Next the screen between the upper and lower supports is subjected to an embossing step, which is preferably achieved through a die-rolling process which lends well to continuous manufacture. The continuously fed gutter guard article can then be cut into sections that are manageable for shipping and subsequent installation.

In a second embodiment, the one-piece gutter guards are made by fully crimping the upper and lower supports upon non-embossed screen edges, similar to the first step of the first embodiment. However, instead of die-rolling the embossed screen pattern, the screen is stamped with the embossed pattern in sections. Often, sections of four feet are standard for one-piece gutter guard.

In a third embodiment, the upper and lower supports are once again formed by roll forming and the non-embossed mesh filter screen is inserted into the recesses of the upper and lower supports. However, in this embodiment, the roll former initially only partially crimps the screen, allowing the flat screen edges to move within the recesses to a small degree when the embossed pattern is applied. After the embossed pattern is applied, the upper and lower supports are then crimped fully, allowing no more movement of the flat screen edges within the recesses of the upper and lower supports.

The finished article has the upper and lower supports crimped to the screen upper and lower edges, wherein the upper and lower edges remain flat; that is, no embossed pattern exists on the portion of the screen located within the recessed portion of the upper and lower supports. The method for making the inventive gutter guard articles achieves the following objects and advantages:

It is a first object of this invention to provide a one-piece gutter guard article which overcomes the "debris pocket" which occurs on present one-piece gutter guards.

It is a second object of this invention to overcome the undulating of the gutter guard wire mesh filtration screen caused when a screen retaining flat edges is embossed prior to inserting the screen edges within the upper and lower supports.

It is a third object of this invention to lower the cost of production of a one-piece gutter guard article by greatly automating the manufacturing steps required when compared to presently known methods for hand-manufacturing one-piece gutter guard articles.

It is a fourth object of this invention to increase the speed of manufacturing of one-piece gutter guard articles by up to five-times.

It is a fifth object of this invention to increase the consistency and quality of one-piece gutter guard articles by employing the method for manufacturing described herein in the various embodiments.

These and other advantages and features of the present invention are described with specificity so as to make the present invention understandable to one of ordinary skill in the art.

BRIEF DESCRIPTION OF THE DRAWINGS

FIG. 2 is a representation of a closeup side view of a prior art gutter guard article engaged in a crimping step showing the embossed lower edge of a wire mesh filtration screen being captured and crimped within the recess of a lower support of a one-piece gutter guard.

FIG. 3A is a closeup cutaway view through the lower support of a prior art one-piece gutter guard article showing the embossed lower edge of a wire mesh filtration screen captured and crimped within the recess of the lower support of the one-piece gutter guard.

FIG. 3B is a closeup elevated perspective view of the lower end of the prior art one-piece gutter guard article of FIG. 3A, showing a debris pocket at the junction of the wire mesh filtration screen and the lower support.

DETAILED DESCRIPTION OF THE DRAWINGS

One-piece gutter guards are comprised of a wire mesh filtration screen, typically of twenty-mesh to forty-mesh range, wherein the wire mesh filter screen is disposed between an upper and a lower metallic or plastic support. The inventors have found that 30-mesh provides a level of stiffness which allows the gutter guard to remain suspended over a gutter and to resist impacts from small branches, pinecones, and the like. The upper and lower supports of a one-piece gutter guard rest on the opposite sides of a gutter, respectively, wherein the wire mesh filtration screen is then positioned over the gutter to filter out water from roof and organic debris. The "one-piece" gutter guard is named as such because it lacks any kind of underlying support beneath the wire mesh filtration screen; rather the article deriving its support from the stiffness of wire mesh used, along with embossed patterns adding an additional measure of stiffness to the article. In U.S. Pat. No. 9,021,747 issued to Lenney, screen corrugations oriented perpendicular to the long axis of a gutter are touted as adding significant stiffness to the wire mesh filtration screen such that no underlying support is needed. The elimination of an underlying support is advantageous from the standpoint of saving materials and labor and thus reducing the cost of manufacturing a one-piece gutter guard.

The manufacture of one-piece gutter guards is enhanced significantly by the instant invention. First, present methods of manufacturing one-piece gutter guards are significantly slowed by the fact that the wire mesh filtration screen must be embossed with ridges or patterns prior to mating the screen to the upper and lower supports and crimping the supports to the screen. Inserting the embossed screen edges into the recesses of the upper and lower supports is man-labor-intensive. One important reason why the embossing of the screen and crimping of the supports upon the screen are presently done in separate manufacturing steps is due to the fact that embossing the screen from edge to edge results in a uniformity of drawing and stretching the screen across its entire surface, without causing the screen to undulate. It has been found that stainless wire mesh screen can stretch up to 50% of its length under mechanical forces, such as embossing. Therefore, embossing the screen prior to crimping the upper and lower supports renders the screen into a consistent, non-undulating form, which can then be crimped to the upper and lower supports, rendering a non-undulating final product.

Figure 1:
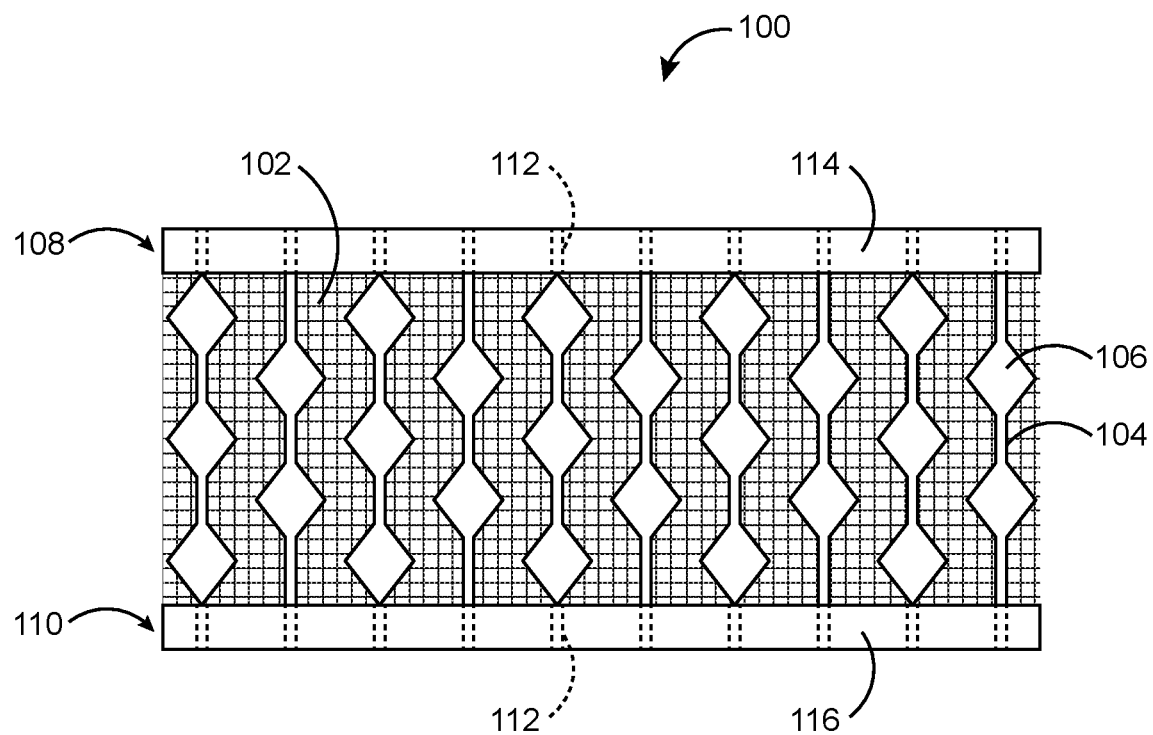
FIG. 1 is a representative plan view of a prior art one-piece gutter guard with upper and lower supports crimped to the upper and lower edges of a wire mesh filtration screen, wherein the screen has embossed ridges extending to the ends of its upper and lower edges (shown in phantom).

However, while a non-undulating final product is achieved when the wire mesh filtration screen is embossed from its top to bottom edges, this design has drawbacks. Manufacturing one-piece gutter guards in this manner creates "debris pockets" which occur at the junction of where the upper and lower supports crimp upon the embossed wire mesh filtration screen. FIG. 1 is an elevated view of a one-piece gutter guard 100 produced from prior art methods. The one-piece gutter guard 100 has an embossed wire mesh filtration screen 102, in this case the embossed pattern being an alternating series of ridges 104 comprised of connected diamond shapes 106. The diamond shapes 106 serve to divert and slow down water as it flows from a roof. The embossed diamond ridge pattern 104, 106 extends from the upper edge 108 to the lower edge 110 of the screen 102. The dotted lines 112 illustrate, in phantom, the extension of the embossed ridge pattern into the recesses (not seen in this view) within the upper 114 and lower 116 supports. An upper support 114 and a lower support 116 are crimped to the upper edge 108 and lower edge 110 of the screen, respectively. The upper and lower supports can be extruded or roll-formed; the recesses for the support being manufactured in the open position to later be crimped closed upon the edges of the wire mesh filtration screen.

FIG. 2 shows a closeup end view of a crimping step of the lower support 116 upon the embossed ridge 118 of a lower edge 110 of a wire mesh filtration screen 102 from a prior art one-piece gutter guard. The lower support 116 is shown positioned in a die press 120 with a lower edge 110 of embossed wire mesh filtration screen 102 positioned in the open recess 122 of the lower support 116 just prior to crimping the recess 122 closed upon the embossed ridge 118 captured in the recess 122. In this case, the embossed pattern is a series of corrugations, this view showing the side of a corrugated ridge 118 captured in the recess 122 between the upper plate 124 and the lower plate 126 of the lower support 116. FIG. 3A shows the same lower edge 110 and lower support 116 of the one-piece gutter guard of FIG. 2, the upper plate 124 and lower plate 126 of the lower support 116 being crimped 128 shut upon the embossed ridge 118 of wire mesh filtration screen 102. The view of FIG. 3A clearly shows how the corrugated ridge 118 limits the closure of the upper plate 124 relative to the lower plate 126, with the crimping edge 128 of the lower support being able to bite a limited distance into the corrugated ridge 118 (portion of ridge inside lower support). FIG. 3B is a closeup elevated view of the junction 130 of the lower support 116 crimped upon the embossed screen lower edge 110. FIG. 3B once again shows the crimping edge 128 is limited in its downward travel by the corrugated ridges 118 (portion of ridge inside lower support 116 indicated in phantom), 119 (portion of ridge outside lower support 116) and the groove portions 132 located beneath lower support 116 forming debris pockets 134 at the junction 130 between the crimping edge 128 and ridge portion 119.

The debris pockets 134 are clearly visible in FIG. 3B, these debris pockets 134 being prone to collecting debris to a point of being resistant to simple cleaning actions such as hosing or sweeping of the gutter guard screen. Inflated buildup of debris due to the debris pockets 134 causes water to run over the debris and over the lower support 116, to fall on the ground below the gutters to which the gutter guard 100 is attached. The debris pockets 134 can, in time, thwart the normal operation and filtering function of the wire mesh filtration screen 102.

Figure 4:
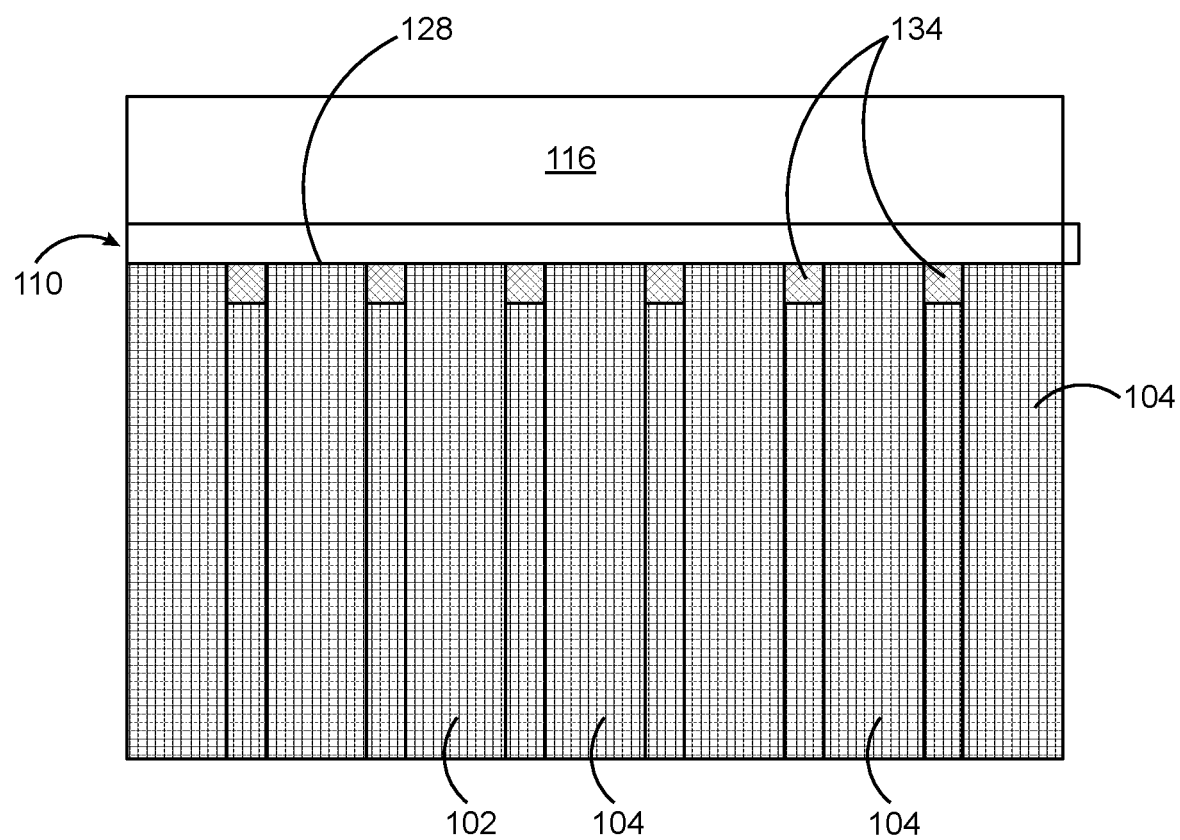
FIG. 4 is a closeup elevated perspective view of a prior art corrugated one-piece gutter guard showing the junction of the lower support with the wire mesh filtration screen and a series of debris pockets existing at the junction.

Referring to FIG. 4, shows an elevated closeup of the junction 130 between a lower support 116 and a corrugated gutter guard screen 102 of the type described in U.S. Pat. No. 9,021,747. Due to the lower support 116 crimping upon the embossed corrugated ridges 104 of the filter screen 102, visible debris pockets 134 form.

Figure 5A:
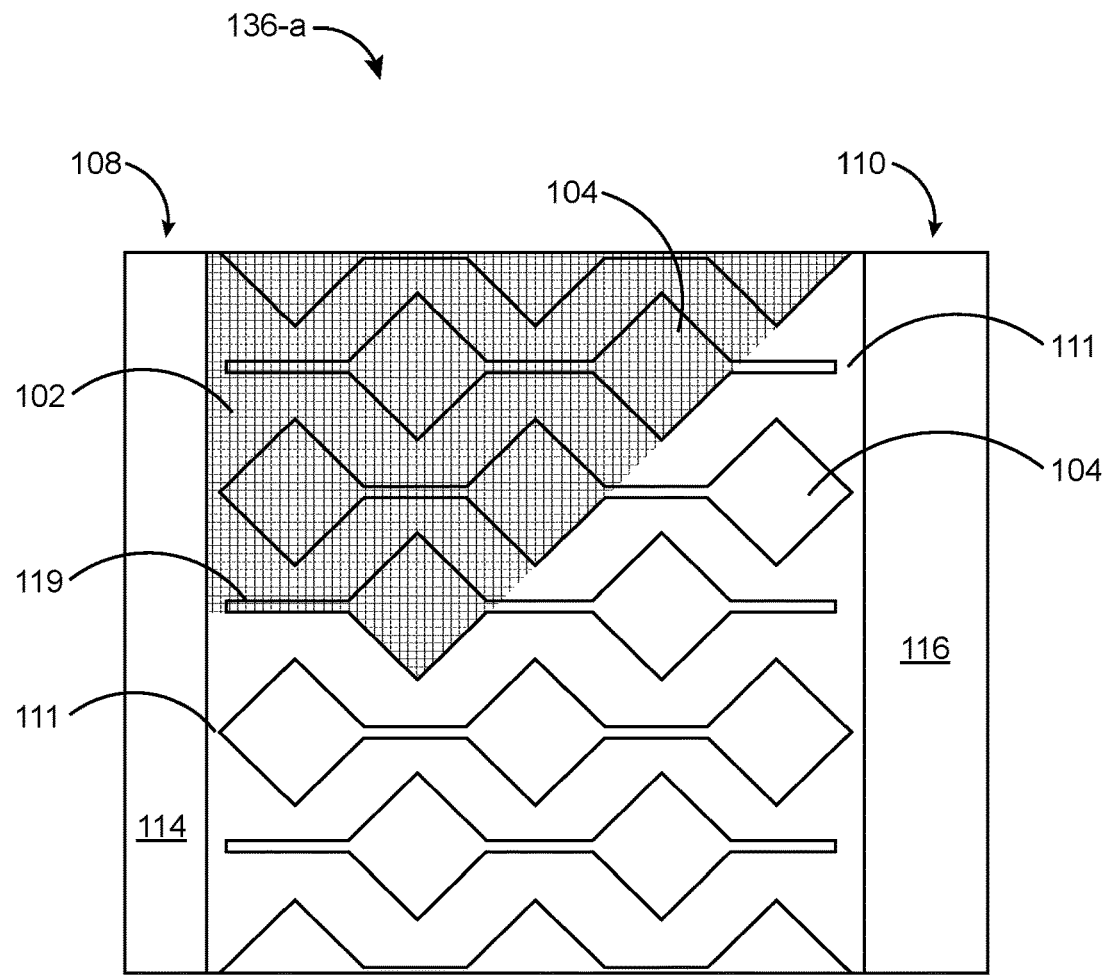
FIG. 5A is a plan view of a section of a one-piece gutter guard article of the present invention having a wire mesh filtration screen comprised of embossed diamond-shaped ridges.
Figure 5B:
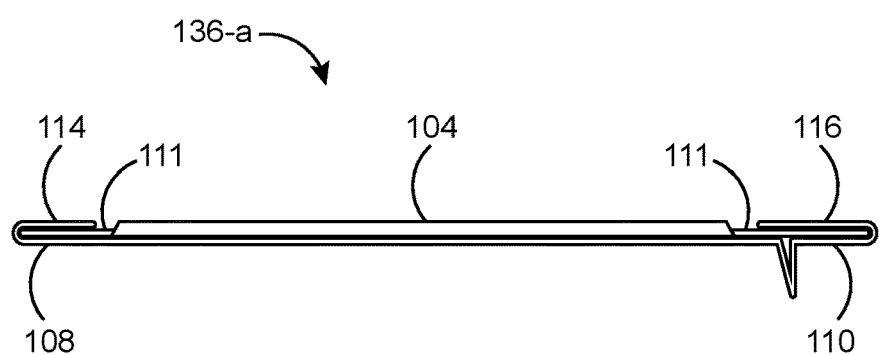
FIG. 5B is a side view of the one-piece gutter guard article of FIG. 5A, showing the upper and lower edges of the wire mesh filtration screen lacking embossed ridges, the upper and lower supports being crimped upon the upper and lower edges of the screen.

Referring to FIGS. 5A and 5B, the one-piece gutter guard 136-a of the present invention is shown without embossments on the upper and lower edges of the screen. That is the upper and lower edges of the screen are planar raw wire screen, which lack any pattern. The embossed ridges 104 of the wire mesh filtration screen reside entirely outside of the upper 114 and lower 116 supports. The upper and lower supports crimp upon entirely flat upper 108 and lower 110 edges of the screen 102. As shown, the embossed ridges 104 stop short (at point 111) of advancing into the recesses of the upper 114 and lower 116 supports. Embossed ridges 104 are formed after the upper and lower supports are crimped onto the screen. The lack of embossed ridges beneath the upper 114 and lower 116 supports reduce or eliminate the incidence of debris pockets, thus allowing the one-piece gutter guard 136-a made by the method of the present invention to be easily swept or hosed-free of collected debris.

Figure 6A:
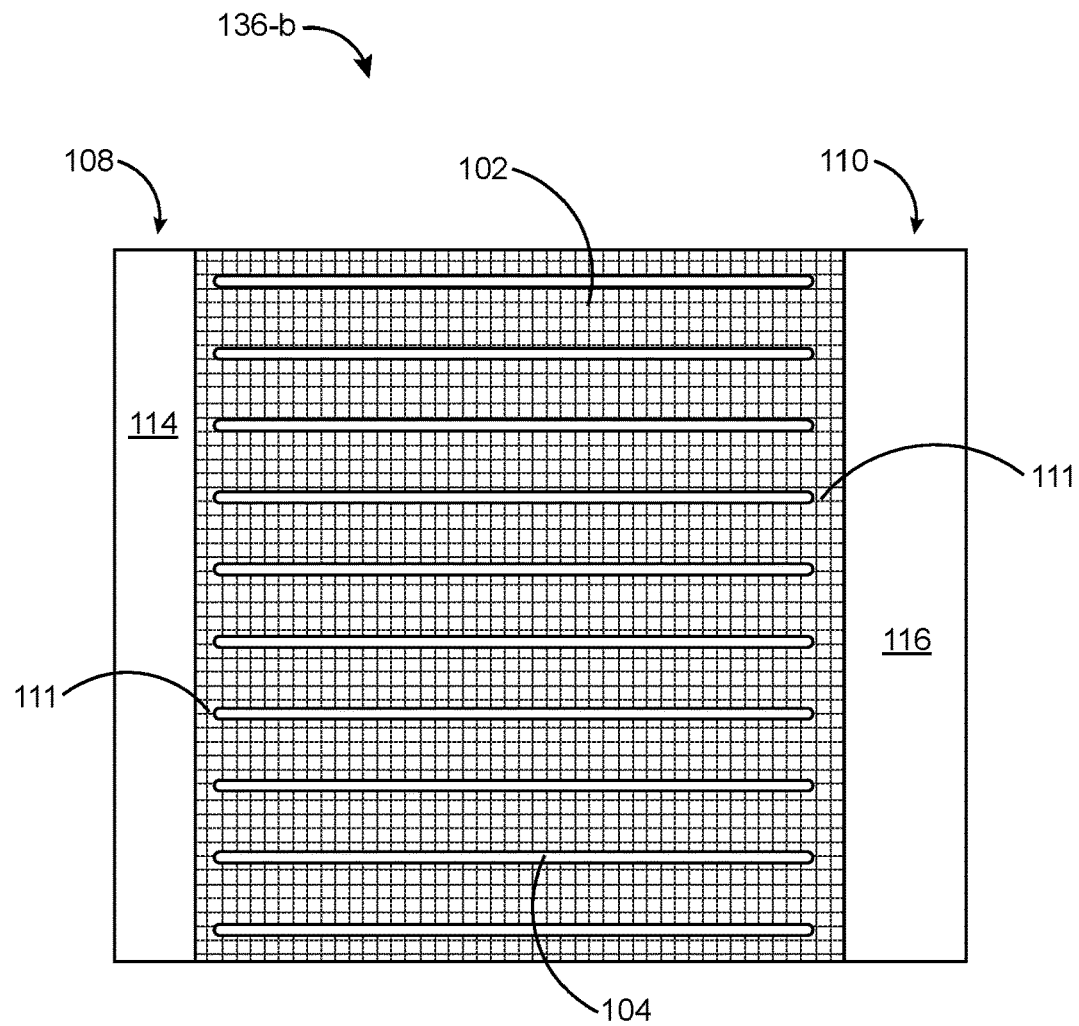
FIG. 6A is a plan view of a section of a one-piece gutter guard article of the present invention having a wire mesh filtration screen comprised of corrugations embossed thereon.
Figure 6B:
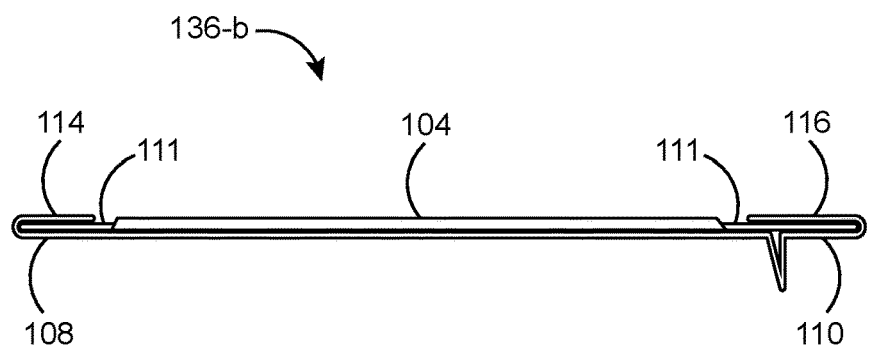
FIG. 6B is a side view of the one-piece gutter guard article of FIG. 6A, showing the upper and lower edges of the wire mesh filtration screen lacking embossed ridges, the upper and lower supports being crimped upon the upper and lower edges of the screen.

FIG. 6A presents an alternate embodiment 136-b of the one-piece gutter guard of the present invention. In this embodiment, the screen 102 is embossed with a plurality of corrugated ridges 104 which run perpendicular to the long axis of a gutter. The corrugations 104 stop short (at point 111) of the upper 114 and lower 116 supports, leaving the upper 108 and lower 110 screen edges devoid of an embossed pattern. FIG. 6B shows the same embodiment of FIG. 6A as seen from a side view.

Figure 7A:
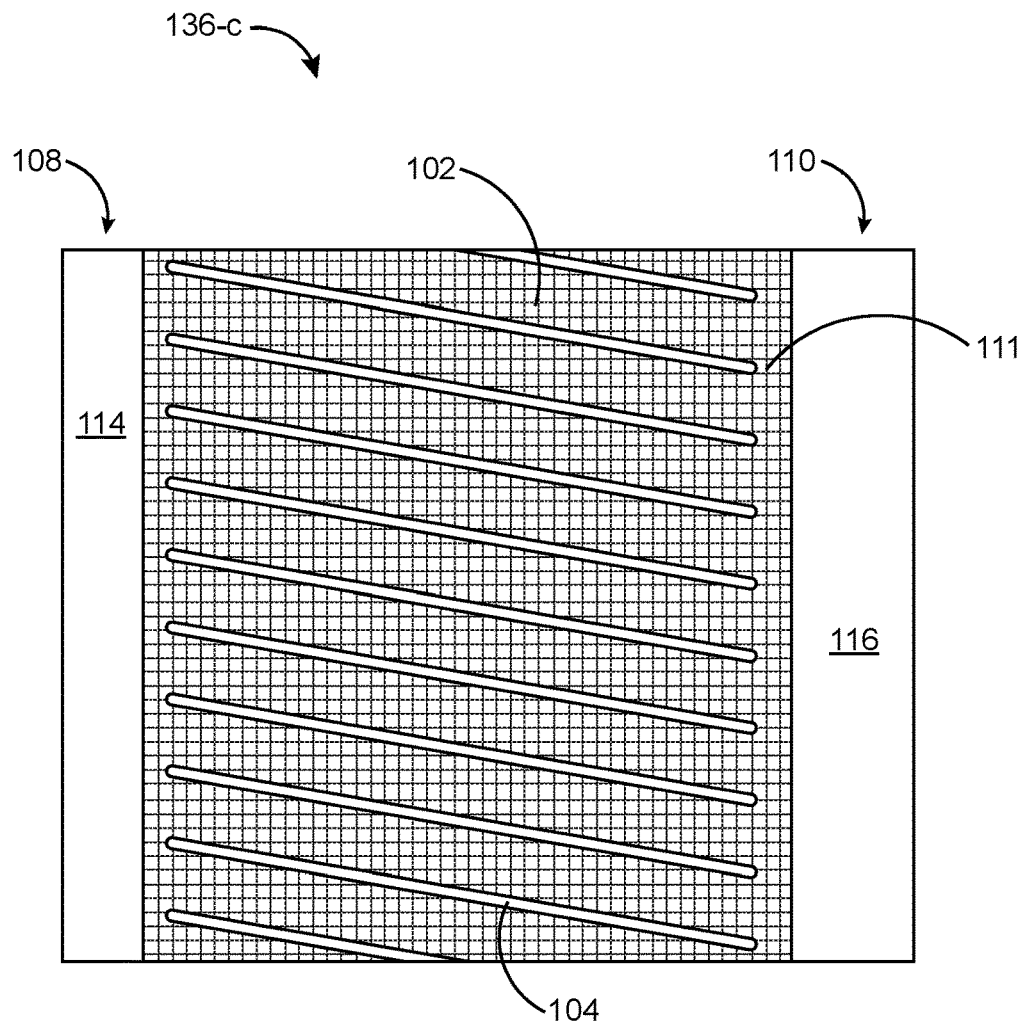
FIG. 7A is a plan view of a section of a one-piece gutter guard article of the present invention having a wire mesh filtration screen comprised of embossed ridges oriented at an offset angle.
Figure 7B:
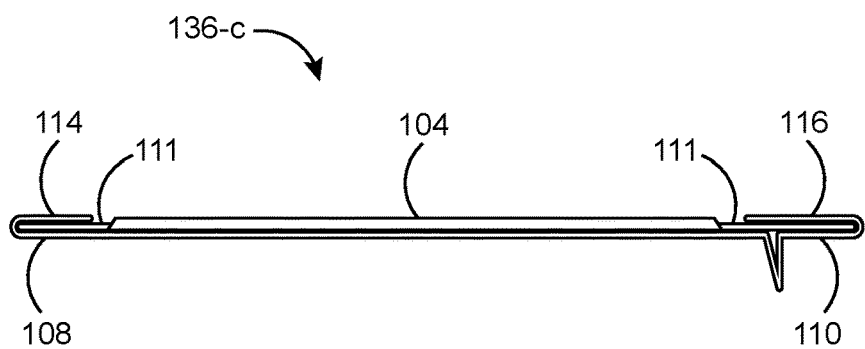
FIG. 7B is a side view of the one-piece gutter guard article of FIG. 7A, showing the upper and lower edges of the wire mesh filtration screen lacking embossed ridges, the upper and lower supports being crimped upon the upper and lower edges of the screen.

FIG. 7A shows a further alternate embodiment 136-c of the one-piece gutter guard of the present invention, wherein a plurality of ridges 104 reside at an offset angle when compared to the long axis of a gutter. Ridges 104 end at point 111, leaving flat screen edges 108, 110 to reside in supports 114, 116, respectively. FIG. 7B shows the same embodiment of FIG. 7A as seen from the side.

Figure 8A:
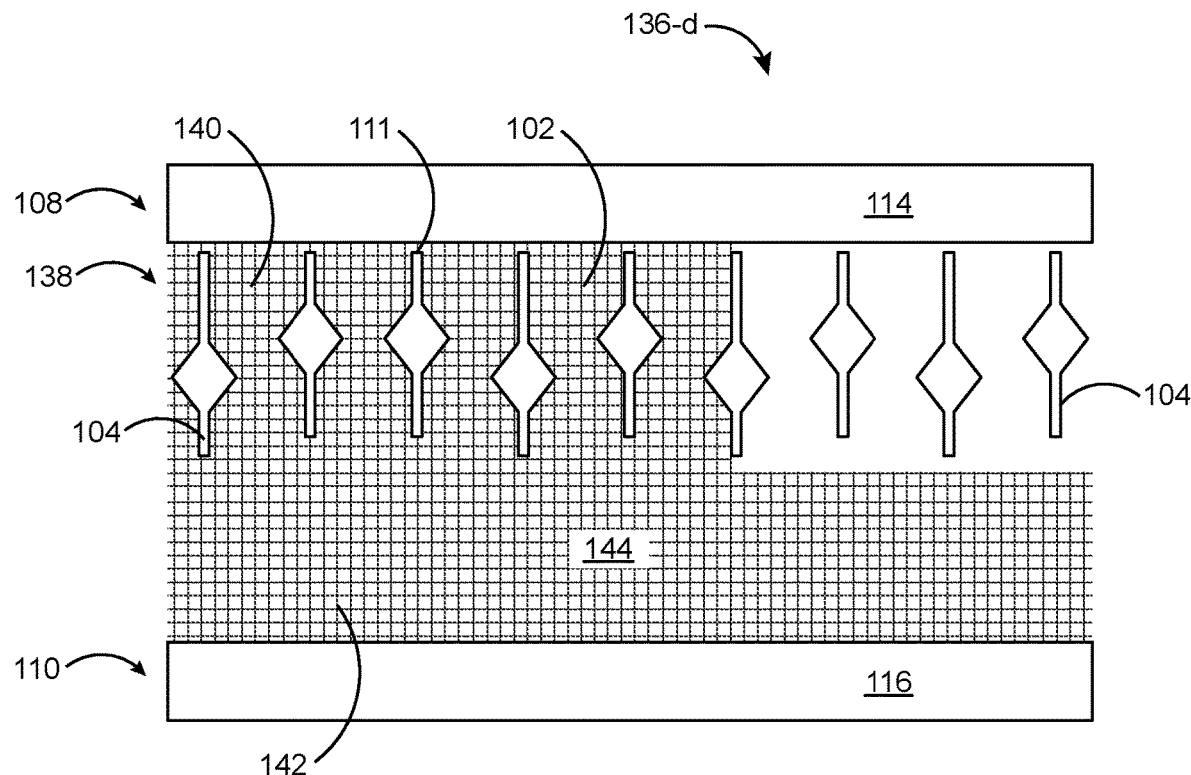
FIG. 8A is a plan view of a section of a one-piece gutter guard article of the present invention having a wire mesh filtration screen comprised of embossed, water-diverting ridges upon the screen's upper portion, wherein the screen's lower portion is devoid of any embossed pattern.
Figure 8B:
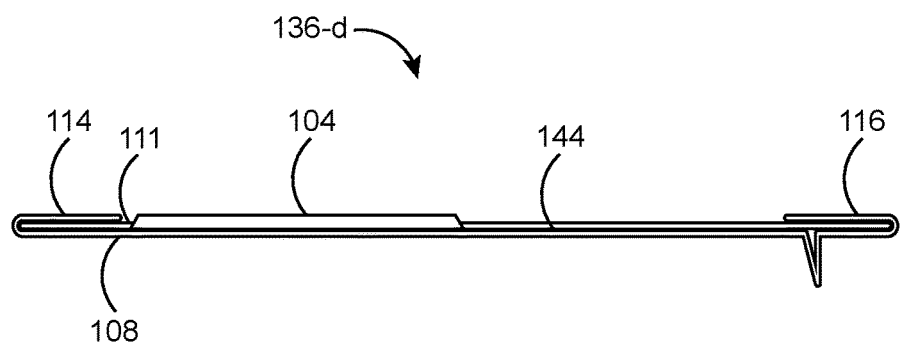
FIG. 8B is a side view of the one-piece gutter guard article of FIG. 8A, showing the upper and lower edges of the wire mesh filtration screen lacking embossed ridges and the lower portion of the screen also lacking embossed ridges.

FIG. 8A shows another alternate embodiment 136-d of the one-piece gutter guard of the present invention, wherein a water-diverting pattern 138 is embossed on an upper section 140 of the screen 102, however, as before, the upper screen edge 108 which resides in the upper support 114 lacks an embossed pattern. The embossed pattern, in this case, a plurality of diamond-shaped ridges 104, does not reside on the lower section 142 of the mesh filter screen 102, leaving an open area of flat screen. It has been found that even in substantial downpours, that a water diverting pattern 138 can cause water flowing over the screen surface to slow down and siphon through the mesh filtration screen 102 at a high rate on the upper section 140 of the screen 102. In fact, the water flow over the upper section 140 surface completely diverts into the gutter within the first inch or two from the upper support 114, provided that a water-diverting pattern resides at the upper section 140 of the screen 102. Leaving an open area 144 beneath the water-diverting pattern 138, allows easier cleaning of debris off the screen surface by sweeping or hosing. FIG. 8B shows the same embodiment of FIG. 8A as viewed from the side.

Figure 9:
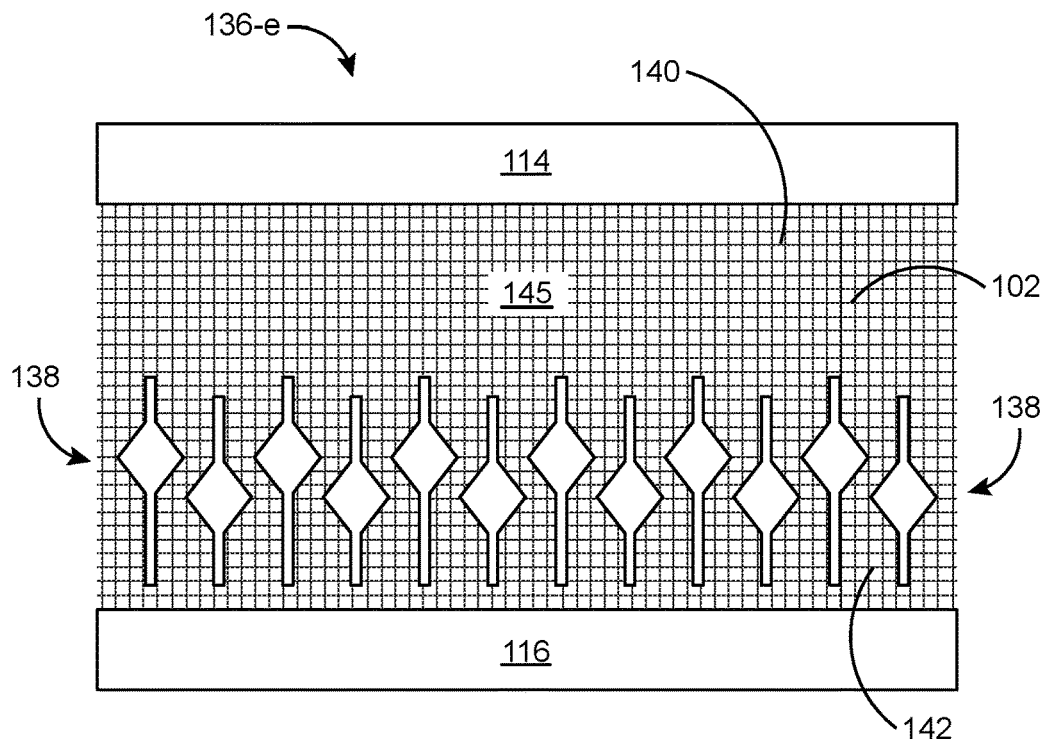
FIG. 9 is a plan view of a section of a one-piece gutter guard article of the present invention having a wire mesh filtration screen comprised of embossed, water-diverting ridges upon the screen's lower portion, wherein the screen's upper portion is devoid of any embossed pattern.

FIG. 9 represents an alternative embodiment 136-e to that shown in FIGS. 8A and 8B in that the water diverting pattern 138 (again a pattern employing diamond-shapes) is embossed on a lower section 142 of the screen 102. This leaves an open area 145 above the water diverting pattern 138.

Figure 10:
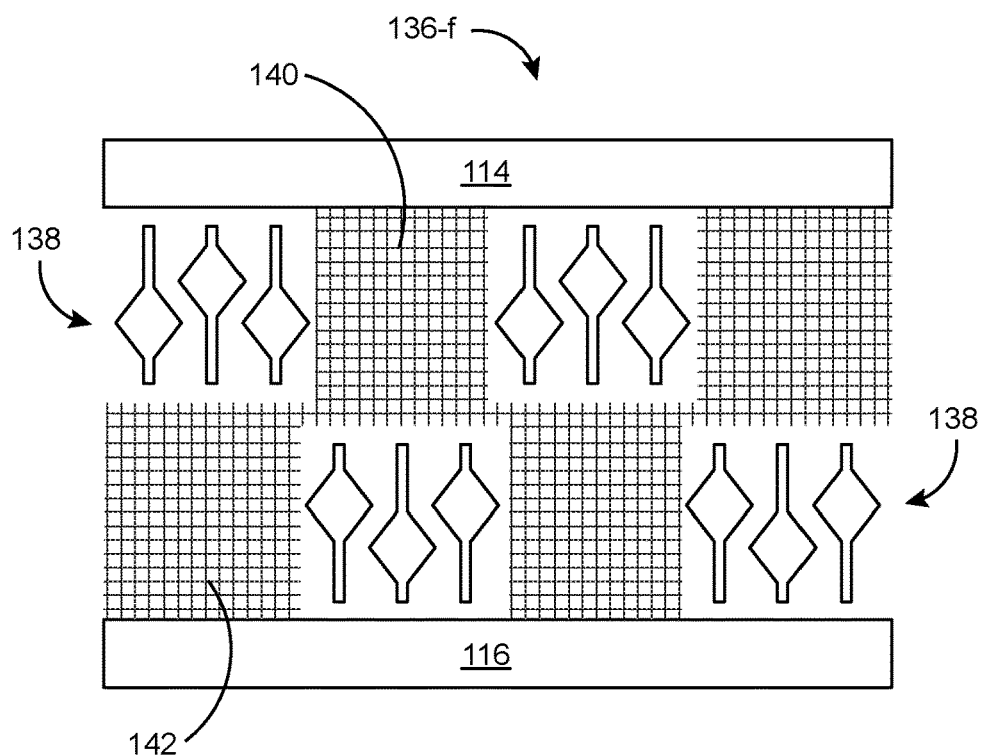
FIG. 10 is a plan view of a section of a one-piece gutter guard article of the present invention having a wire mesh filtration screen comprised of embossed, water-diverting ridges alternating upon the screen's upper and lower portions with sections devoid of ridges also alternating upon the screen's upper and lower portions.

FIG. 10 represents still another alternate embodiment 136-f of the embossed diamond water diverting pattern 138. In this embodiment, the pattern alternates on the upper section 140 and lower section 142 of the screen 102.

Figure 11:
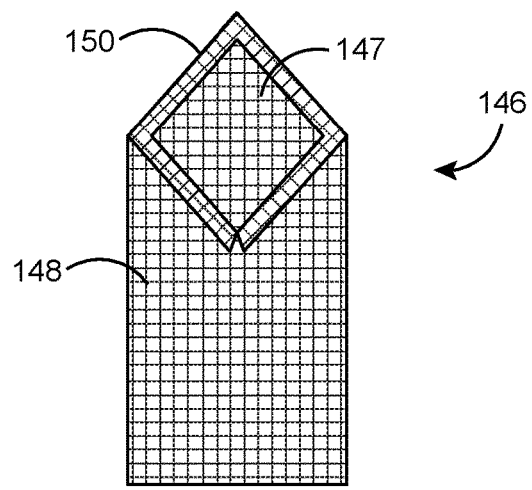
FIG. 11 is an elevated closeup perspective view of a section of screen where an embossed portion lies next to a non-embossed portion.

The method of the present invention proposes inserting non-embossed wire mesh filtration screen 102 into the recesses 122 of the upper 114 and lower 116 supports, crimping the supports onto the non-embossed screen edges 108, 110, and then applying an embossed pattern to the portion of the screen located between the upper 114 and lower 116 supports. FIG. 11 illustrates a section of screen 146 where an embossed ridge 147 (here, an embossed diamond shape) lies next to a non-embossed section of screen 148 such as a non-embossed screen edge 108, 110. The inventive one-piece gutter guard incorporates such sections of screen where embossed portions lie adjacent to the non-embossed screen edge captured in the recesses of the upper and lower supports. Where embossing tooling contacts the screen 146, such as with die stamping or die rolling, the screen wires are gathered up and stretched at areas 150 located between the embossed ridge 147 and non-embossed section 148 of screen 146. Stainless steel wires can stretch up to 50% of their length. The stretching and gathering of wires in areas 150 exacts an anomaly at the junction of the embossed ridge 147 and non-embossed portion 148, which causes a tendency of the screen to undulate. These undulations can rise as much as two-inches above a level surface, making it man-labor intensive to try to force the undulating screen edges into the recesses 122 of the upper 114 and lower 116 supports.

Figure 12:
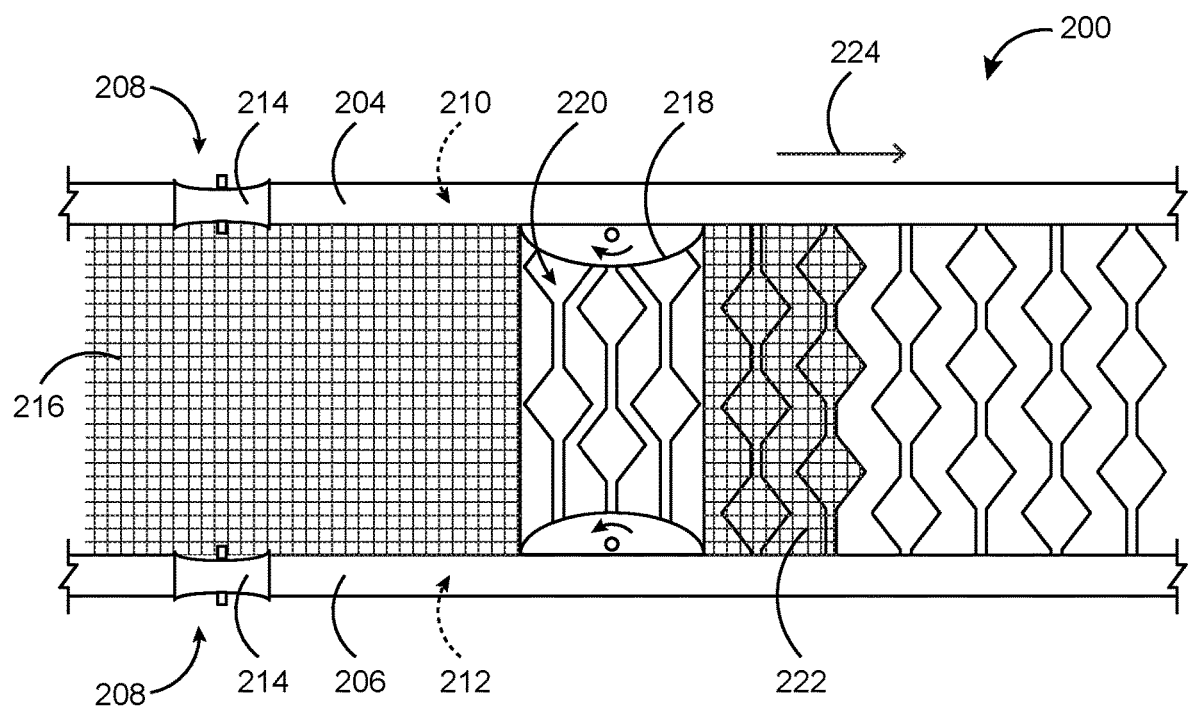
FIG. 12 is a plan view of a continuous-feed embossing step of the inventive manufacturing process showing a roller die embossing a screen pattern into the one-piece gutter guard article and a roll former crimping the upper and lower support onto the wire mesh filtration screen.

Referring now to FIG. 12, the crimping of the upper 204 and lower 206 supports as well as the embossing step is shown for a production run of gutter guard article 200 in top plan view. The gutter guard article 200 is shown being fed first through a roll former 208 as a continuous feed, the roll former crimping non-embossed screen edges to the upper 204 and lower 206 supports. Rollers perform the crimping operation, the top roller 214 of the roll former 208 shown in this view. Prior to this step, the continuous process could include a step, or steps wherein the upper and lower supports are formed by successively forming sheet metal into upper and lower supports having lengthwise recesses 226 (See FIG. 13A) for inserting the upper and lower edges of the mesh filtration screen. In another embodiment, the upper and lower supports can be extruded with lengthwise recesses ready for crimping to the upper and lower edges of the mesh filtration screen.

Following formation of the upper 204 and lower 206 supports and crimping them to the edges 210, 212 (crimped edges shown by phantom lines, but not visible in this view) of the non-embossed wire mesh filtration screen 216, the continuous process subjects the non-embossed screen 216 to a roller die 218 to create the embossed screen 222. Here, because it is a plan view, only the top roller die 218 possessing the screen pattern 220 is shown; normally, a bottom roller (not shown in this view) also exists to work in conjunction with the top roller die 218 to feed the article in the direction shown by arrow 224. Likewise, the roll former 208 is comprised of a top roll 214 and a bottom roll 215, the bottom roll not being visible in this view.

The manufacturing process described herein allows for continuous manufacturing of one-piece gutter guards which eliminates the man-labor-intensive steps heretofore applied in the gutter guard manufacturing arts. In the prior art, the flat screen was embossed completely top to bottom, prior to manually attaching the upper and lower support. This required a man-labor intensive step of trying to fit embossed upper and lower screen edges into the upper and lower supports. The inventor has found it is simpler to align and fit flat, non-embossed screen edges into the upper and lower supports; in fact, this step can be automated in a continuous-feed manner where the non-embossed screen edges are mechanically guided into the recesses of the upper and lower support prior to crimping.

Figure 13A:
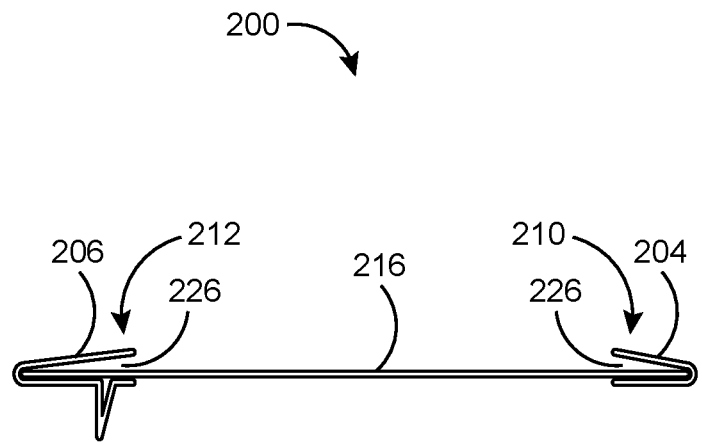
FIG. 13A is a side view of a one-piece gutter guard article of the present invention being manufactured, showing the upper and lower edges of the wire mesh filtration screen inserted into the upper and lower supports prior to crimping the supports upon the screen.
Figure 13B:
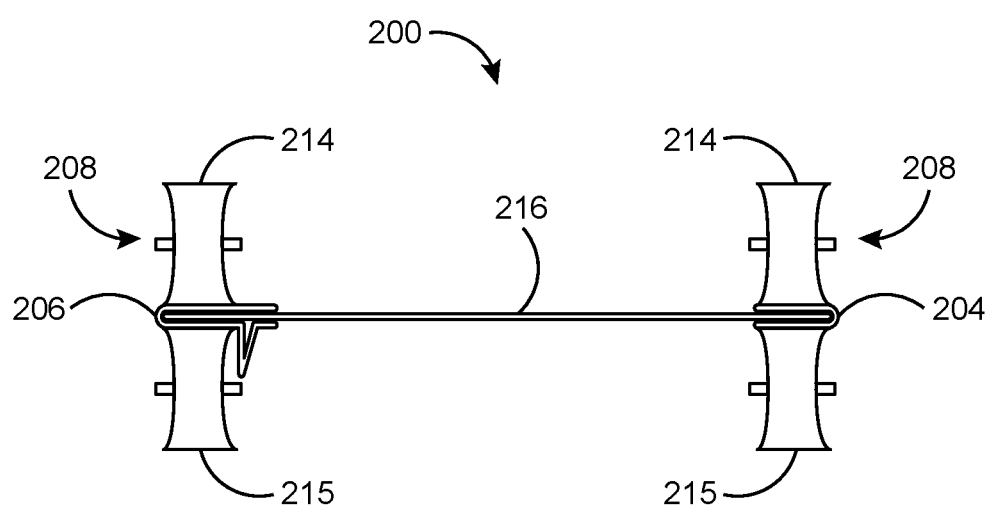
FIG. 13B is a side view of a one-piece gutter guard article introduced in FIG. 13A, showing the upper and lower supports being crimped upon the upper and lower edges of the wire mesh filtration screen by a roll former.

Referring to FIG. 13A, a cross section of the one-piece gutter guard article 200 is shown as it might appear as part of a continuous feed process wherein the flat, non-embossed wire mesh filtration screen 216 is fed into the recesses 226 of the upper support 204 and the lower support 206. The uniformity of the planar wire mesh filtration screen 216 prior to being embossed allows it to be automatically fed into the recesses 226 of the upper and lower supports. Recesses 226 of upper support 204 and lower support 206 face each other, ready to accept the non-embossed edges of screen 216. The feeding of the upper and lower edges of screen 216 preferably occurs simultaneously. Additionally, it is preferable that the crimping of the upper and lower supports upon the screen edges occurs simultaneously. Alternatively, the screen 216 could be manually fed into the recesses 226, however automating this step can increase the speed of manufacture as much as five times over the manual process. FIG. 13B illustrates the crimping step using a roll former 208 on the upper 204 and lower 206 supports. Here, top 214 and bottom 215 rollers act to close the recesses 226 and crimp the upper support 204 and lower support 206 upon the wire mesh filtration screen 216. After the recesses are crimped upon the upper and lower screen edges with sufficient pressure, the assembly is further continuously fed into the roller die 218 to emboss the screen pattern 220 onto the embossed screen 222 as described and shown in FIG. 12. After embossing is applied, the continuously fed gutter guard article 200 is fed into a cutter (not shown), which typically cuts the gutter guard article 200 into four-foot sections which can be stacked and readied for shipment to customers.

Figures 14, 15:
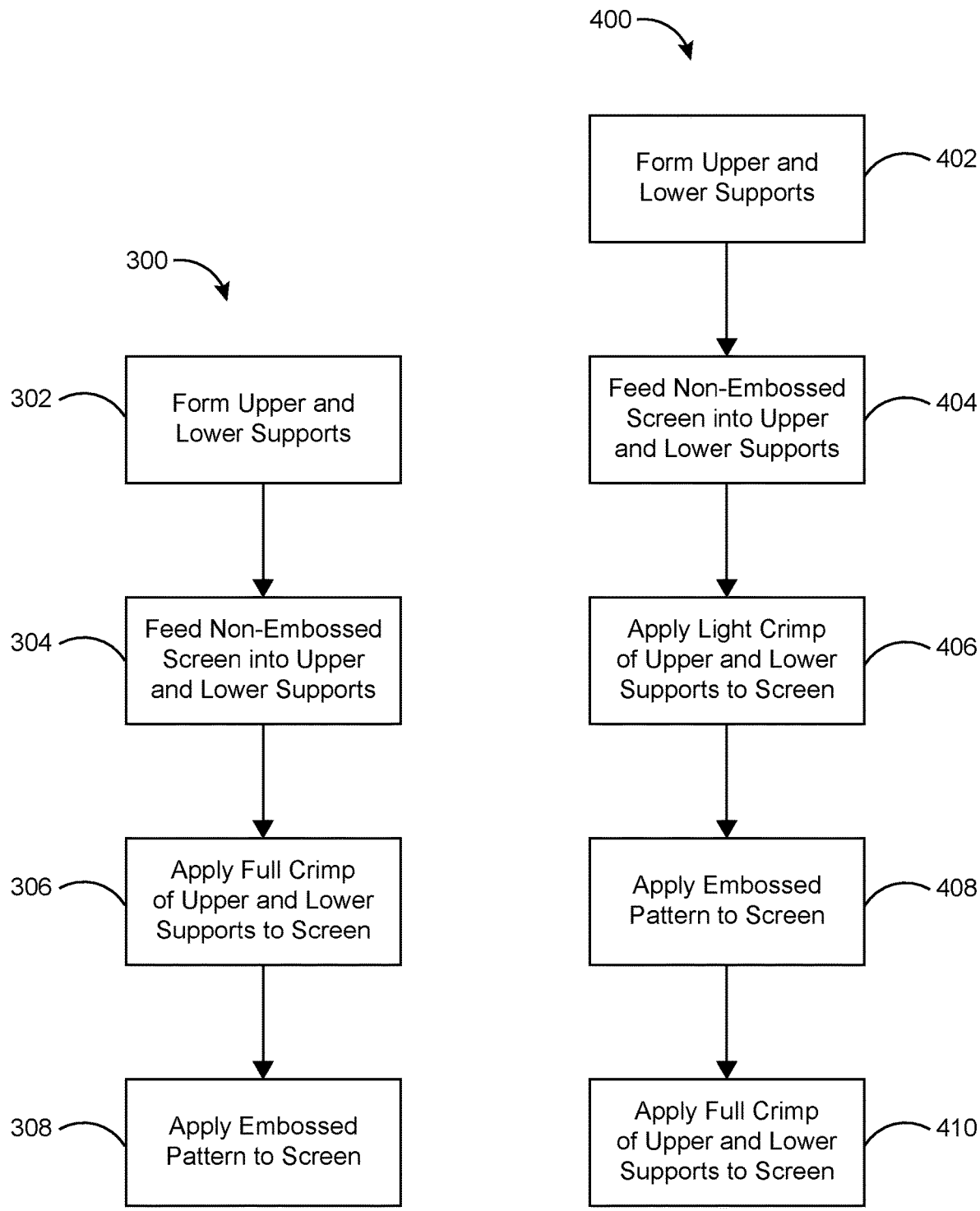
FIG. 14 is a flow chart showing the steps of a method of manufacturing the one-piece gutter guard article of the present invention.
FIG. 15 is a flow chart showing the steps of an alternative embodiment of the method of manufacturing the one-piece gutter guard article of the present invention.

The crimping step during the roll forming step can be altered in one of two preferred ways. FIG. 14 shows a flow chart 300 of the basic steps of forming the upper and lower supports 302, feeding the non-embossed screen 216 into the upper and lower supports 304, applying a full crimp of the upper and lower supports upon the screen 306 and then applying the embossed pattern to the screen 308 to render an embossed screen 222. This process shown in FIG. 14 crimps the wire mesh filtration screen with sufficient pressure so as to render the non-embossed upper and lower screen edges immovable within the upper and lower supports.

However, allowing the screen edges to move slightly in the upper and lower supports during the embossing step can relieve flexing in the screen and thereby aid in helping the final gutter guard product to lie flat. As shown by the alternative method 400 in FIG. 13, after the upper and lower supports are formed 402 and the screen is fed into the recesses 404 of the supports, the crimping step is practiced in two stages. A first stage has the non-embossed screen edges crimped lightly 406 in the recesses of the upper and lower supports. This light crimp is carried out prior to the embossing step 408 and allows the non-embossed screen edges to move within the recesses of the upper and lower supports, when the embossing step occurs, yet holds the screen within the supports. This slight movement allows the screen some "give" and relieves flexing in the screen due to stretching of the screen as described previously. After the embossing step, the upper and lower supports receive a second and final, full crimp 410, again using a roll former; this time the screen is crimped immovably in the upper and lower supports.

The method for manufacturing the one-piece gutter guard article could be modified in a variety of ways. For example. where the embossed pattern is applied through die rolling, the embossed pattern could also be applied through a die stamping step. Also, the process could be modified from a continuous process where rather, the one-piece gutter guard articles are produced in sections, however, the flat non-embossed screen would still be inserted and crimped into the upper and lower supports of each section and then stamped or die-rolled with an embossed pattern.

Finally, although the description above contains much specificity, this should not be construed as limiting the scope of the invention, but as merely providing illustrations of some of the presently preferred embodiments of his invention. This invention may be altered and rearranged in numerous ways by one skilled in the art without departing from the coverage of any patent claims which are supported by this specification.

What is claimed is:

1. A continuous feed method for manufacturing a gutter guard article, the method comprising the steps of:
   a) providing a continuous feed of wire mesh filtration screen with upper and lower planar edges;
   b) providing a continuous feed upper and lower support, the upper and lower support each comprising a lengthwise open recess, the lengthwise open recesses of the upper and lower supports positioned facing opposite of each other;
   c) continuously feeding the upper planar edge of the wire mesh filtration screen into the lengthwise open recess of the upper support;
   d) continuously feeding the lower planar edge of the wire mesh filtrations screen into the lengthwise open recess of the lower support;
   e) partially crimping the lengthwise open recess of the upper support closed over the upper planar edge of the wire mesh filtration screen;
   f) partially crimping the lengthwise open recess of the lower support closed over the lower planar edge of the wire mesh filtration screen;
   g) wherein the completion of steps (e) and (f) leave a mid-section of the wire mesh filtration screen disposed between the upper support and lower support;
   h) placing a pattern into the mid-section of the wire mesh filtration screen, the pattern stopping short of the upper support and lower support, wherein the operation of steps (e) and (f) allow movement of the upper and lower planar edges of the wire mesh filtration screen within the upper and lower supports when the pattern is applied;
   i) fully crimping the upper support over the upper planar edge of the wire mesh filtration screen;

j) fully crimping the lower support over the lower planar edge of the wire mesh filtration screen;

k) wherein the operation of steps (i) and (j) prevent movement of the upper and lower planar edges of the wire mesh filtration screen within the upper and lower supports;

l) cutting the article produced in steps (a)-(k) into sections of a desired length to form the gutter guard article.

2. The continuous feed method for manufacturing the gutter guard article as recited in claim 1, wherein steps (c) and (d) occur simultaneously.

3. The continuous feed method for manufacturing the gutter guard article as recited in claim 2, wherein steps (e) and (f) occur simultaneously.

4. The continuous feed method for manufacturing the gutter guard article as recited in claim 3, wherein steps (i) and (j) occur simultaneously.

5. The continuous feed method for manufacturing the gutter guard article, as recited in claim 1, wherein step (h) is accomplished by die rolling the pattern into the mid-section of the wire mesh filtration screen.

6. The continuous feed method for manufacturing the gutter guard article, as recited in claim 1, wherein step (h) is accomplished by die stamping the pattern into the mid-section of the raw wire mesh filtration screen.

\* \* \* \* \*